United States Patent
Sapozhnikov

(10) Patent No.: US 7,662,228 B2
(45) Date of Patent: Feb. 16, 2010

(54) CONCRETE WITH ENRICHED QUARRY LIMESTONE WASTE AS A COARSE AGGREGATE

(75) Inventor: Naum Sapozhnikov, 1550 N. Poinsettia Pl., apt. 210, Los Angeles, CA (US) 90046

(73) Assignee: Naum Sapozhnikov, Los Angeles, CA (US)

( * ) Notice: Subject to any disclaimer, the term of this patent is extended or adjusted under 35 U.S.C. 154(b) by 302 days.

(21) Appl. No.: 11/501,956

(22) Filed: Aug. 9, 2006

(65) Prior Publication Data

US 2007/0017419 A1 Jan. 25, 2007

Related U.S. Application Data

(63) Continuation-in-part of application No. 10/775,496, filed on Feb. 10, 2004, now abandoned.

(60) Provisional application No. 60/447,408, filed on Feb. 14, 2003.

(51) Int. Cl.
C04B 7/00 (2006.01)
C04B 14/26 (2006.01)

(52) U.S. Cl. ............... 106/713; 106/738; 106/816; 106/817

(58) Field of Classification Search ............ 106/713, 106/738, 816, 817
See application file for complete search history.

(56) References Cited

U.S. PATENT DOCUMENTS 6,451,105 B1 * 9/2002 Turpin, Jr. .............. 106/738

* cited by examiner

*Primary Examiner*—Paul Marcantoni

(57) ABSTRACT

Concrete with coarse aggregate defined as enriched limestone waste of grading intermediate between the coarse and fine aggregates is characterized by specified compressive strength and modulus of rupture up to 5,000 psi and more than 750 psi, respectively, and is an enriched by-product of the manufacture of crushed limestone of regular sizes finer than 9.5 mm. and includes and amount of aggregate finer than 4.75 mm. which is close to, but not exceeding, two-thirds of the total weight of aggregate most of which is coarser than 2.36 mm., the amount of aggregate finer than 0.3 mm. not exceeding about three percent of the total weight of aggregate, concrete with this specified aggregate mixture requiring less consumption of cement and admixture than that of concrete of the same compressive strength and less flexural strength with crushed granite of regular sizes of as coarse aggregate and is much less expensive.

13 Claims, No Drawings

CONCRETE WITH ENRICHED QUARRY LIMESTONE WASTE AS A COARSE AGGREGATE

REFERENCE TO RELATED APPLICATION

This Application is a Continuation-in-Part of patent application Ser. No. 10/775,496, filed Feb. 10, 2004 now abandoned. Provisional Patent Application 60/447,408 Filing Data Feb. 14, 2003.

FEDERALLY SPONSORED RESEARCH

Not Applicable

SEQUENCE LISTING PROGRAM

Not Applicable

BACKGROUND

1. Field of Invention

The present invention relates to the field of design and manufacture of concrete.

2. The Prior Art

The considerable part of concrete in world building practice is used for road construction, and problem of coarse aggregates for concrete is urgent for road construction industry. Crushed granite is the universal coarse aggregate for concrete, but it constitutes only 15% of US production of coarse aggregates. High cost and shortage of crushed granite requires the solutions allowing reduction of this coarse aggregate in road construction. One of these solutions is composite concrete pavement designed according to Portland Cement Association Engineering Bulletin (Thickness Design for Concrete Highway and Street Pavements, Portland Cement Association, EB109P). To reduce the consumption of normal concrete with crushed granite or other hard rock as a coarse aggregate it provides a lean concrete subbase and/or lower layer of modulus of rupture in the range from 150 to 450 psi. The purpose of the composite pavements is in replacing of a part of normal concrete by a subbase or lower layer of cheaper concrete. An increase of flexural strength of the subbase and/or lower layer of composite concrete pavement is very efficient; it permits a reduction of the thickness of the normal concrete surface course. The increase of the value of modulus of rupture of lean concrete of subbase from 150 to 450 psi means an increase in equivalent normal concrete thickness of the composite concrete pavement at least by 15% with the possibility of a corresponding reduction of thickness of the normal concrete surface course. Strength and cost of lean concrete is determined mainly by the coarse aggregate. Local or recycled aggregates are used usually for lean concrete, resulting in cost saving and conservation of high-quality aggregates.

The use of cheap small grains coarse aggregates is the one of the ways of obtaining of lean and not only lean concrete. Small grains crushed limestone is one of the cheapest aggregates. According to the US Geological Survey, crushed limestone constitutes 71% of total weight of coarse aggregates for concrete produced in USA. American building practice rejects the use of material finer than 9.5 mm and especially finer than 4.75 mm as a coarse aggregate, though the most popular sizes of coarse aggregate No. 57 and No. 67 according to ASTM C36 can include up to 15 and 10 percents of material finer than 9.5 mm and 4.75 mm, respectively. According to the Specification of Florida DOT (Section 346, Portland Cement Concrete), it is necessary to "produce all concrete using Size No. 57 or Size No. 67 coarse aggregate". The nominal dimensions of these Sizes are in the range from 25.0 to 4.75 mm and from 19.0 to 4.75 mm, respectively. Grading of these sizes of coarse aggregate can include up to 15 and 10 percents of material finer than 9.5 mm and 4.75 mm, respectively. However these most popular in American building practice Sizes No. 57 and 67 of coarse aggregate for concrete are produced usually without content of material finer than 9.5 mm; material of grading (minus-⅜") is considered as a primary fines, i. e. as a by-product of manufacture of coarse aggregates of grading required by consumer.

The stockpiling technology of limestone fines is presented in the report of the University of Florida "Research and Techno-Economical Evaluation: Uses of Limestone Byproducts". According to this report "primary fines (minus-⅜ inch) originate during primary crushing and sizing/washing of aggregate raw material prior to processing by the commercial products plant. These materials are commonly discarded as waste, while the plus-⅜" material is further crushed and sized/washed to produce commercial coarse aggregate products. Byproduct fines produced during this latter stage of processing are termed secondary fines, and are either discarded as waste, or further processed into fines products. For the purpose of this study, two size fractions of both primary and secondary fines were examined, the coarse fraction (minus ⅜" plus -200 mesh) including screening (minus-4 mesh, i. e. finer than 4.75 mm, by plus -40 mesh), and the fine fraction (minus-200 mesh)."

According to the above report, "the accumulation of fines (minus-⅜ inch) produced by the coarse aggregate industry in the state of Florida is one of the major problems facing the industry today. According to a survey by the U.S. Bureau of Mines Mineral Industry, plant waste factors for all of the types of fines range from 15% to 25% of total production, a value likely underestimated for the coarse aggregate industry in the state of Florida. The survey also estimates that "there are presently 4 billion tons of quarry fines stockpiled in the United States. These quantities are likely to increase by another two billion tons by the turn of the century in response to increased production levels, stricter environmental regulations, and an increased demands for clean coarse aggregate products." While discussing of this question nationwide, it should be taken into account that 70% of coarse aggregate in the U.S. building practice is crushed limestone, and about half of stockpiled limestone fines is screenings.

The cost of limestone screenings is less than half that of crushed limestone of regular sizes and less than one-fourth that of crushed granite of regular sizes ($ 3, 6-7, and 12-14 for short ton, respectively, as applied to Midwest and South). It relates to fresh by-products of manufacture of crushed limestone of regular sizes. As applied to stockpiled limestone fines, this difference should be considerably greater.

The object of design of composite concrete pavements is to obtain the highest concrete strength of subbase and lower layer of this pavement with the cheapest coarse aggregate and the moderate consumption of cement.

OBJECTS AND ADVANTAGES

The most important object of the present invention is obtaining of concrete with a processed by-product of manufacture of regular sizes crushed limestone defined as enriched limestone waste as a coarse aggregate. Grading of this aggregate in aggregate bin of concrete plant is intermediate between the least Size of coarse aggregate No. 89 and largest Size No. 9 of fine aggregate according to ASTM C33. The values of specified compressive strength and modulus of rupture of this concrete should amount up to 5,000 psi and more than 750 psi, respectively. Compressive and flexural strength of concrete with this coarse aggregate is substantially as high or higher than that of concrete of the same consumption of cement and twice as high consumption of admixture with coarse aggregate of crushed granite of regular sizes No. 57 and No. 67 of nominal dimensions 25.0 to 4.75 mm and 19 to 4.75 mm, respectively.

Another important object of the present invention is very efficient utilization of a considerable part of great deposits of limestone fines as a coarse aggregate for concrete of the specified compressive strength and modulus of rupture up to 5,000 psi and more than 750 psi, respectively.

The main advantage of the present invention is to obtain of concrete with the values of specified compressive strength and modulus of rupture up to 5,000 psi and more than 750 psi, respectively, using a processed by-product of the manufacture of crushed limestone of regular sizes.

SUMMARY OF THE INVENTION

Concrete with coarse aggregate defined as enriched limestone waste of grading intermediate between the least Size of coarse aggregate No. 89 and largest Size No. 9 of fine aggregate according to ASTM C33 is characterized by the specified compressive strength and modulus of rupture of concrete up to 5,000 psi and more than 750 psi, respectively. This coarse aggregate is a processed by-product of the manufacture of crushed limestone of regular sizes. The limestone waste as a by-product of manufacture of crushed limestone of regular sizes is washed and clean material. The aim of enrichment of this by-product is the reduction of small sizes of grains. According to the invention the amount of material finer than 0.3 mm should not exceed about 3% of the total weight of coarse aggregate. This non-rigid limitation of the volume of grains of small sizes allows carrying out of enrichment of this aggregate by inexpensive sizing without more expensive washing.

Limestone quarry waste as a raw material for enrichment should be finer than 9.5 mm. The amount of aggregate finer than 4.75 mm (Sieve No. 4) before enrichment should be about 50% of the total weight of aggregate. After enrichment the main part of aggregate finer than 4.75 mm should be coarser than 2.36 mm. The amount of aggregate finer than 2.36 mm (Sieve No. 8) after enrichment should not exceed about 10%; the amount of aggregate finer than 1.18 mm (Sieve No. 16) should not exceed about 7%; the amount of aggregate finer than 300 μm (Sieve No. 50) should not exceed about 3%.

Handling and transportation of enriched limestone waste from a quarry to the aggregate bin of a concrete plant causes an inevitable breakdown of aggregate. Due to weather effects and other impacts such as loading and discharge, grading of enriched limestone waste may become unpredictable. However, a few parameters of grading of enriched limestone waste after transportation from a quarry to the aggregate bin of a concrete plant should be controlled in the framework of the present invention. The amount of aggregate finer than 4.75 mm (Sieve No. 4) should be about ⅔ of the total weight of aggregate. The main part of this aggregate should be coarser than 2.36 mm; the amount of aggregate finer than 2.36 mm (Sieve No. 8) should not exceed about 10% of the total weight of aggregate. The amount of aggregate finer than 1.18 mm (Sieve No. 16) should not exceed about 7% of the total weight of aggregate. The amount of aggregate finer than 300 μm (Sieve No. 50) should not exceed about 3% of the total weight of aggregate. Grading of enriched limestone waste after transportation from a quarry to the aggregate bin of a concrete plant can be considered as intermediate between the least Size of coarse aggregate No. 89 and largest Size No. 9 of fine aggregate according to ASTM C33.

According to the definition of ASTM C 125 (Standard Terminology Relating to Concrete and Concrete Aggregates) "coarse aggregate, n-(1) aggregate predominantly retained on the 4.75-mm (No. 4) sieve; or (2) that portion of an aggregate remained on the 4.75-mm (No. 4) sieve". The increase of the part of the material finer than 4.75 mm up to about ⅔ of the total weight of aggregate provides a very efficient way of utilization of great deposits of limestone fines.

Concrete of specified compressive strength and modulus of rupture up to 5,000 more than 750 psi, respectively, with enriched limestone waste as coarse aggregate is very cheap and efficient. It is considerably less expensive than concrete with crushed granite of regular sizes as a coarse aggregate of the same compressive and flexural strength, and it can be used for civil and industrial construction as well as for road construction. The use of this concrete for composite concrete pavement means a considerable reduction in initial cost of construction this pavement and increase of its competitiveness as compared with that of an asphalt pavement. Moreover, this concrete can be very efficient as the lean concrete subbase of asphalt pavement.

Use of concrete with this coarse aggregate allows very profitable utilization of great deposits of crushed limestone finer than 9.5 mm usually estimated as limestone quarry waste and especially of aggregate finer than 4.75 mm. In so doing the volume of utilized aggregate finer than 4.75 mm should constitute at least 50% of the volume of utilized aggregate finer than 9.5 mm.

DETAILED DESCRIPTION OF PREFERRED EMBODIMENT

Concrete of specified compressive strength $f_c'$ up to 5,000 psi and and modulus of rupture more than 750 psi is produced with the coarse aggregate defined as enriched limestone quarry waste of grading intermediate between the least Size of coarse aggregate No. 89 and the largest Size of fine aggregate No. 9 according to ASTM C 33. Physical properties of this coarse aggregate should be in accordance with requirements of the ASTM C33. Compressive strength of this concrete is higher at least by 10% than that for concrete of the same consumption of cement with crushed limestone of the least Size of coarse aggregate No. 89 and the largest Size of fine aggregate No. 9. Moreover, compressive strength of said concrete is substantially as high or higher than that of concrete of the same consumption of cement and twice as high consumption of admixture with crushed granite of regular sizes No. 57 and No. 67 of nominal dimensions 25.0 to 4.75 mm and 19 to 4.75 mm, respectively. Flexural strength of this concrete is higher than that for concrete of the same consumption of cement with the crushed granite of regular sizes as a coarse aggregates.

Limestone quarry waste is a by-product of manufacture of crushed limestone of regular sizes. As a raw material for enrichment it should be finer ⅜ in (9.5 mm). The proportion between the amounts of aggregate finer and coarser than 4.75 mm before enrichment is very important; the problem of utilization of aggregate finer than 4.75 mm is more urgent than that for part of this by-product coarser than 4.75 mm. Moreover, aggregate finer than 4.75 mm is considerably cheaper than part of this by-product finer than 9.5 mm and coarser than 4.75 mm. According to the invention, the amount of aggregate finer than 4.75 mm at the quarry before enrichment should be about 50% of the total weight of aggregate.

The proportion between the amounts of aggregate finer and coarser than 4.75 mm before enrichment should be determined taking into account an inevitable breakdown of this aggregate due to dry enrichment by sizing and especially due to transportation of this aggregate to the concrete plant. The breakdown of aggregate is caused by weather conditions (rain, frost, thawing) and handling of this aggregate (loading, discharge and other actions during transportation from quarry to aggregate bin of concrete plant). Due to the influence of scale effect this breakdown relates mainly to the portion of aggregate coarser than 4.75 mm. As a result, the amount of aggregate finer than 4.75 mm in the aggregate bin of concrete plant can be considerably higher than at the quarry. The amount of this fraction in the aggregate bin of concrete plant should be about ⅔ of the total weight of aggregate. Transportation of very vulnerable enriched limestone waste of 10 percents water-absorption from quarry to concrete plant under adverse weather conditions results in the doubling of amount of aggregate finer than 4.75mm—from ⅓ to ⅔ of the total amount of aggregate. Less water-absorption of aggregate and actual reduction of the quantity of adsorbed water means less breakdown of aggregate and more similar proportions between amounts of aggregate finer and coarser than 4.75 mm at the quarry and in the aggregate bin.

The by-product of manufacture of crushed limestone of regular sizes is washed and clean material. The aim of enrichment of this by-product is the reduction of small sizes of grains. According to the invention the amount of material finer than 0.3 mm should not exceed about 3% of the total weight of coarse aggregate. This limitation of the volume of grains of small sizes allows carrying out of enrichment of this aggregate by inexpensive sizing without more expensive washing.

Transportation of enriched limestone waste from quarry to the aggregate bin of concrete plant causes the reduction of amount of large size grains and a corresponding increase of the amount of small size grains since large size grains are more vulnerable. It can make grading of this aggregate variable and even unpredictable. However, a few parameters of grading of enriched limestone waste after transportation from a quarry to the aggregate bin of a concrete plant should be controlled in the framework of the present invention. The amount of aggregate finer than 4.75 mm (Sieve No. 4) should be about ⅔ of the total weight of aggregate. The main part of aggregate finer than 4.75 mm should be coarser than 2.36 mm; the amount of aggregate finer than 2.36 mm (Sieve No. 8) should not exceed about 10% of the total weight of aggregate. The amount of aggregate finer than 1.18 mm (Sieve No. 16) should not exceed about 7% of the total weight of aggregate. The amount of aggregate finer than 300 μm (Sieve No. 50) should not exceed about 3% of the total weight of aggregate. Grading of enriched limestone waste in aggregate bin of concrete plant should be finer than the least Size of coarse aggregate number 89 and coarser than for largest Size of fine aggregate number 9 according to ASTM C 33. This grading can be considered as intermediate between the coarse and fine aggregates in Terminology of ASTM C125.

According to the definition of ASTM C 125 (Standard Terminology Relating to Concrete and Concrete Aggregates) "coarse aggregate, n-(1) aggregate predominantly retained on the 4.75-mm (No. 4) sieve; or (2) that portion of an aggregate remained on the 4.75-mm (No. 4) sieve". As applied to the enriched limestone waste as a coarse aggregate of the claimed concrete in the aggregate bin of concrete plant the amount of aggregate finer than 4.75 mm (Sieve No. 4) should be about ⅔ of the total weight of aggregate. The increase of the part of material finer than 4.75 mm up to about ⅔ of the total weight of aggregate results in a very efficient way to utilize of a great deposits of limestone fines.

Experimental investigations of the washed by-product of manufacture of crushed limestone as a coarse aggregate for concrete were carried out in Moscow Institute of Concrete and Reinforced Concrete (NIIZHB). These investigations were necessary due to the shortage and high cost of crushed granite as a coarse aggregate in the Moscow region; it was attempt to find more cheap coarse aggregate at least for concrete of middle strength. Enriched limestone waste product of Lavsk quarry of Lipetsk region (350 km South East of Moscow) was used for this purpose. This is the washed by-product of the manufacture of crushed limestone of regular Russian Sizes 5-20 mm (the closest American Size is number 67, 19-4.75 mm) and 20-40 mm defined as Russian fraction 3-10 mm.

Samples were taken from a large volume cone according to the Russian standard (very close to the similar ASTM standard) and were delivered to Institute laboratory in bags retaining quarry grading after enrichment of this aggregate. The crushing strength of limestone waste was estimated by compressing in a 150 mm-diameter cylinder. Loss of weight of tested samples made up 17%. According to the Russian building code, this loss of weight corresponds to compressive strength of coarse aggregate equal to 600 kgf/cm$^2$ (near 8500 psi). This is half as much as minimum strength of crushed granite Grades 1200-1400 kgf/cm$^2$.

Water-absorption of limestone waste is equal to 10%; specific gravity is equal to 2.46 g/cm^3; bulk density is equal to 1390 kg/m$^3$; the voids volume is estimated as 43%.

Frost resistance of limestone waste was determined by the test of samples in the solution of sodium sulfate with subsequent drying. The loss of mass after 10 cycles made up 10%. According to the Russian building code, frost resistance of limestone waste is estimated as Grade F50. The content of dissoluble silica in limestone waste makes up 21 milliliters per liter.

Samples of aggregate were dried to constant weight. Averaged results of sieve analysis of enriched limestone waste as a coarse aggregate defined as fraction 3-10 mm according to the Russian building code are presented in Table 1 in the form adopted in the US building practice.

TABLE 1

| | Dimensions of Square Openings (mm) | | | | |
|---|---|---|---|---|---|
| | 12.50 | 10.00 | 5.00 | 2.50 | Less than 2.5 |
| Sieve residue (%) | 0.75 | 0.75 | 64.00 | 25.50 | 9.0 |
| Amount finer than each laboratory sieve (%) | 99.25 | 98.5 | 34.50 | 9.00 | — |

As can be seen from Table 1, grading of this aggregate considered as a quarry grading is close to that for Size number 89 as the least Size of coarse aggregate according to ASTM C33. Besides, a samples of washed finer limestone waste from a neighboring quarry defined as a 2-5 mm Russian fraction of fine aggregate of grading close to that for the largest Size of fine aggregate number 9 according to ASTM C 33 also was tested as a coarse aggregate of concrete. Physical properties of aggregates fractions 3-10 and 2-5 are the same. It was made for estimation of change of concrete strength depending on the change of grading of small grains crushed limestone used as a coarse aggregate of this concrete. Moreover, comparison of concrete strength of samples with coarse aggregate of the different grading allows estimation the change of strengths of concrete caused by a possible breakdown of this aggregate due to handling and transportation from quarry to aggregate bin of concrete plant. Results of sieve analysis of this aggregate (Russian fraction 2-5 mm) are presented in Table 2.

TABLE 2

| | Dimensions of Square Openings (mm) | | | | | | |
|---|---|---|---|---|---|---|---|
| | 5.0 | 2.5 | 1.25 | 0.63 | 0.315 | 0.16 | under 0.16 |
| Sieve residue (%) | 20.5 | 69.5 | 8.75 | 0.45 | — | — | 0.8 |
| Amount finer than each laboratory sieve (%) | 79.50 | 10.00 | 1.25 | 0.8 | 0.8 | 0.8 | |

To estimate compressive strength of concrete with washed limestone waste of fractions 3-10 and 2-5 mm as a coarse aggregate standard cubes 10×10×10× cm were made with the use of Portland cement Brand 500-DO-N of the Oscol cement plant without admixture. According to the Russian building practice of production of precast concrete cubes were subjected to standard steam-curing according to following pattern; 3+3+6+4, i.e. 3 hrs of conditioning, 3 hrs of the temperature rise to 80° C., 6 hrs of isothermal warming, and 4 hrs of cooling. One-day compressive strength of steam-cured concrete makes up 60-65% of 28-day strength of this concrete. 28-day compressive strength of steam-cured concrete makes up 90% of 28-day strength of concrete of natural maturing. Test results of compressive strength of concrete brought to the standard European cube 15×15×15 cm and corresponding estimations of cylindrical strength (psi) are presented in Table 5. Cylindrical strength of concrete is estimated to be 1.2 times less than the cubic strength of this concrete. Concrete mixes number 1, 3, 5 were made with enriched waste defined as a Russian fraction 3-10 mm (Table 1) as a coarse aggregate, mixes number 2, 4, 6 were made with an aggregate defined as a Russian fraction 2-5 mm (Table 2) as a coarse aggregate.

concrete strength. The efficiency of the use of enriched limestone waste as a coarse aggregate in industrial conditions was checked at the Moscow plant of precast concrete No. 10. Crushed limestone of the grading of Russian fraction 3-10 mm with water-absorption equal to 10% as a very vulnerable coarse aggregate was used for this aim. Ten double-side tipping wagons with 500 m3 of enriched limestone waste were delivered from the Lavsk quarry to the concrete plant. Grading of this aggregate at the quarry is presented in Table 1. Results of sieve analysis of this limestone waste at the concrete plant are presented in the Table 4.

TABLE 4

| | Dimensions of Square Openings (mm) | | | | | | | |
|---|---|---|---|---|---|---|---|---|
| | 10.0 | 5.0 | 2.5 | 1.25 | 0.63 | 0.315 | 0.16 | Under 0.16 |
| Sieve residue (%) | 2.4 | 30.6 | 58.7 | 3.0 | 0.9 | 1.66 | 2.2 | 0.54 |
| Amount finer than each laboratory sieve (%) | 2.4 | 67.0 | 8.3 | 5.3 | 4.4 | 2.74 | 0.54 | — |

As can be seen from the Table 4, grading of enriched limestone waste at the concrete plant differs considerably from the grading of this aggregate at the quarry after enrichment. It changes due to loading, autumn rains, and moving by bulldozers to aggregate bin after discharge from wagons on concrete pavement of the concrete plant store. The amount of aggregate finer than 5 mm constituted near ⅓ of the total weight of aggregate before transportation to the concrete plant, while the amount of this aggregate at the concrete plant is close to the ⅔ of the total weight of aggregate. The main part of the aggregate is finer than 5 mm and coarser than 2.5 mm. The grading of enriched limestone waste after transpor-

TABLE 3

| | Composition of ready-mixed Concrete (kg/m^3) | | | | | | Cubic compressive strength Mpa/ Cylindrical compressive strength psi | |
|---|---|---|---|---|---|---|---|---|
| Number | Cement | Sand | Coarse aggregate | Water/cement ratio | Density of mix (kg/m^3) | Slump (cm) | 1 day | 28 days |
| 1 | 198 | 751 | 1,068 | 1.05 | 2,225 | 6.5 | 5.8/690 | 10.0/1190 |
| 2 | 197 | 740 | 1,066 | 1.05 | 2,210 | 7.0 | 4.8/570 | 8.0/950 |
| 3 | 347 | 596 | 1,091 | 0.61 | 2,245 | 8.0 | 19.4/2,310 | 29.0/3,450 |
| 4 | 350 | 580 | 1,100 | 0.60 | 2,240 | 8.5 | 17.9/2,130 | 28.3/3,370 |
| 5 | 498 | 478 | 1,075 | 0.43 | 2,265 | 7.5 | 37.1/4,420 | 42.0/5,000 |
| 6 | 500 | 483 | 1,060 | 0.42 | 2,255 | 9.0 | 31.1/3,700 | 38.4/4,570 |

As one can see from Table 3, the use of crushed limestone of Russian fraction 3-10 mm with the grading close to that for Size No. 89 as a coarse aggregate for concrete allows to achieve compressive strength of concrete in the range from 1,000 to 5,000 psi. Finer crushed limestone of Russian fraction 2-5 mm of grading close to that for the Size number 9 is less efficient as a coarse aggregate. Compressive strength of concrete with this coarse aggregate is less at least by 10% than that for concrete with coarse aggregate of grading close to that for the Size number 89.

All said above relates to concrete with coarse aggregate of washed limestone waste delivered to the Institute laboratory from the quarry without a change of its grading. It is necessary to estimate the actual breakdown of this aggregate due to transportation from quarry to plant and its impact on the tation to the concrete plant can be considered close to intermediate between coarse and fine aggregates in Terminology of ASTM C125., i. e. between grading of Sizes number 89 and 9 according to ASTM C33.

The tests of concrete with limestone waste of this grading were carried out, the consumption cement being the same as for prestressed piles. It was made to estimate maximum compressive strength of concrete with crushed limestone as a coarse aggregate of this grading. Concrete for piles is produced only with granite crushed stone as a coarse aggregate, and consumption of portland cement Brand 500-DO-N of the Volsk cement plant for this concrete is equal to 460 kg per cubic meter of concrete. The peculiarity of concrete for prestressed piles is the required one-day cubic compressive strength, which should be not less than 30 Mpa. This cubic strength corresponds to a cylindrical strength equal to 3570 psi. According to the Russian building practice of producing of precast concrete, cubes were subjected to the standard steam-curing. Test results of concrete are presented on Table 5.

admixture as compared with that for concrete with crushed granite as a coarse aggregate (Tables 3 and 5).

Thus, crushed limestone in aggregate bin with the amount of aggregate finer than 4.75 mm about ⅔ of the total weight of aggregate, with the amount of aggregate finer than 4.75 mm

TABLE 5

| | | | Composition of ready-mixed concrete (kg/m^3) | | | | Cubic compressive strength Mpa Cylindrical compressive strength psi | | | |
|---|---|---|---|---|---|---|---|---|---|---|
| | | | | | | | 1 day | | 28 days | |
| Number | Cement | Sand | Coarse aggregate | Water/cement ratio | Admixture (%) | Slump (cm) | f cu | f cu avg | f cu | f cu avg |
| 1 | 500 | 483 | 1060 | 0.324 | — | 6 | 20.9 | 22.60 | 29.9 | 30.60 |
| | | | | | | | 24.3 | 2,960 | 33.3 | 3,640 |
| 2 | 500 | 483 | 1060 | 0.308 | 0.5 | 7 | 21.8 | 21.10 | 30.4 | 29.45 |
| | | | | | | | 20.5 | 2,510 | 28.5 | 3,505 |
| 3 | 500 | 483 | 1060 | 0.420 | — | 8 | 20.9 | 20.65 | 39.9 | 39.45 |
| | | | | | | | 20.4 | 2,460 | 39.4 | 4,700 |
| 4 | 500 | 512 | 1110 | 0.370 | — | 6 | 23.8 | 24.50 | 46.5 | 46.05 |
| | | | | | | | 25.2 | 2,920 | 45.6 | 5,480 |
| 5 | 500 | 512 | 1110 | 0.280 | 0.3 | 6 | 41.8 | 42.00 | 46.1 | 47.75 |
| | | | | | | | 42.2 | 5,000 | 49.4 | 5,685 |
| 6 | 450 | 560 | 1110 | 0.280 | 0.3 | 6 | 35.6 | 34.80 | 40.9 | 40.40 |
| | | | | | | | 33.7 | 4140 | 39.9 | 4,810 |
| 7 | 400 | 610 | 1110 | 0.280 | 0.3 | 4 | 32.3 | 34.20 | 43.2 | 43.45 |
| | | | | | | | 36.1 | 4070 | 43.7 | 5,170 |

Three first series of test can be considered as attempts of fitting to very unusual coarse aggregate; crushed limestone was not used as a coarse aggregate on the plant. Four other series of test of this concrete should be considered as quite successful. Enriched limestone waste as a coarse aggregate after considerable breakdown caused by the handling and transportation to the concrete plant in the adverse weather conditions allows to obtain concrete of specified compressive strength up to 5,000 psi and even more.

The efficiency of enriched limestone waste of the certain grading as a coarse aggregate can be estimated by the compressive strength of concrete with this coarse aggregate. As can be seen from the Tables 3 and 5, enriched limestone waste of grading intermediate between the coarse and fine aggregate in Terminology ASTM C125 is more efficient as a coarse aggregate than crushed limestone of grading close to that for the Size No. 89 and that of grading close to that for the Size No. 9 according to the ASTM C33. Compressive strength of concrete with crushed limestone of this grading as a coarse aggregate is higher at least by the 10% than that for concrete of the same consumption of cement with crushed limestone of grading close to that for the Size No. 89 as a coarse aggregate. Compressive strength of this concrete is considerably higher than that for concrete of the same consumption of cement with crushed limestone of grading close to that for the Size No. 9 as a coarse aggregate. Moreover, consumption of cement for concrete with crushed limestone as a coarse aggregate of grading intermediate between the least Size of coarse aggregate No. 89 and the largest Size of fine aggregate No. 9 according to ASTM C 33 is less at least by the 10% than that for concrete of the same compressive strength with crushed granite of regular sizes as a coarse aggregate. One-day concrete strength exceeding that required for prestressed piles was achieved with reduction of the consumption of cement by more than ten-percent and one half the consumption of but coarser than 2.36 mm in the range 55- 60% of the total weight of aggregate, and with the amount of aggregate finer than 0.3 mm not exceeding about 3% of the total weight of aggregate can be considered as a coarse aggregate of optimal grading in terms of compressive strength of concrete. This grading can be considered as intermediate between the coarse and fine aggregate in the Terminology ASTM C125. Concrete with crushed limestone of this grading as a coarse aggregate requires less consumption of cement and admixture than concrete of the same compressive strength with crushed granite and any hard rock aggregate of regular sizes as a coarse aggregates. Concrete with crushed limestone of this grading as a coarse aggregate requires less consumption of cement than concrete of the same compressive strength with crushed limestone of grading corresponding to that for Sizes number 89 and 9 according to the ASTM C33 as a coarse aggregate.

Variation of grading of enriched limestone waste is inevitable; it is in the nature of this material. Requirements for grading of enriched limestone waste as a coarse aggregate at the quarry after enrichment and in the aggregate bin of concrete plant should limit influence of variation of grading of this aggregate on the strength of concrete. However, adverse conditions of transportation of this aggregate to the concrete plant can cause its excessive breakdown. It does not mean that enriched limestone waste of this grading can not be used as a coarse aggregate for concrete. However excessive breakdown of this coarse aggregate influences the strength of concrete. If the amount of aggregate finer than 4.75 mm exceeds ⅔ of the total weight of aggregate in the aggregate bin, it means a reduction of concrete strength. Additional consumption of cement is required to compensate for the degradation of this aggregate.

Tests of concrete with the different grading of crushed limestone as a coarse aggregate allow to estimate the acceptable limits of variation of grading of enriched limestone waste as a coarse aggregate in aggregate bin of concrete plant. As can be seen from the tables 5 and 7, compressive strength of concrete with crushed limestone of grading close to that for the Size No. 9 is less at least by 10% than that for concrete with crushed limestone of grading close to that for the Size No. 89. Compressive strength of this concrete is considerably less that for concrete with crushed limestone of grading intermediate between the coarse and fine aggregate in the Terminology ASTM C 125. The use of enriched limestone waste of grading finer than that for the Size number 9 as a coarse aggregate should be considered as undesirable; additional breakdown of aggregate requires a non-proportional increase in consumption of cement.

Flexural strength of concrete is an important quality of concrete. As applied to the thickness design of concrete pavement, flexural strength is the main quality of concrete. Concrete with crushed limestone as a coarse aggregate of grading intermediate between the coarse and fine aggregates in the Terminology ASTM C125 can be considered as optimal in terms of flexural strength at least as compared with concrete with hard rock coarse aggregates of regular sizes. The compressive strength of concrete with this coarse aggregate is higher than that for concrete of the same consumption of cement with crushed granite of regular sizes as a coarse aggregate, and the increase in compressive strength of concrete means an increase in flexural strength of this concrete.

As with the strength of any structural material, flexural strength of concrete should be characterized by the specified value, design flexural strength being estimated as a part of specified flexural strength. American building code ACI 318 and documents of Portland Cement Association do not contain the definition of specified concrete flexural strength. Current thickness design procedure of concrete pavements allows considering the modulus of rupture as a specified concrete flexural strength. According to said Portland Cement Association Engineering Bulletin (Thickness Design for Concrete Highway and Street Pavements, Portland Cement Association, EB109P), the modulus of rupture of concrete should be estimated as the average 28-day flexural strength. The value of flexural strength multiplied by 50 psi, which is less than the experimental estimation of the mean value of this strength but is nearest to it, should be chosen as the modulus of rupture (MR) of this concrete.

It is well known that flexural strength is not an inherent quality of concrete as is compressive strength. Compressive strength of concrete is the best studied quality of concrete, and it is very important to provide means for estimation of statistical characteristics of flexural strength of concrete by means of those for compressive strength of this concrete. Statistical characteristics of flexural strength of normal concrete in connection with those for compressive strength of this concrete were obtained by processing the data of the results of American tests of cylindrical compressive strength and flexural strength of concrete, and American and British tests of the compressive strength of modified cubes and the flexural strength of concrete (Sapozhnikov N. Safety of Precast Reinforced Concrete and Prestressed Structural Members by the Second Limit State (Serviceability Limit State). State Committee of Construction of the USSR Institute of Information, Moscow, 1991, Table 6, FIG. 8, Appendix 1).

Statistical connections between compressive and flexural strength of concrete were estimated by the values of coefficient of correlation between these two types of concrete strength. Coefficients of correlation between the compressive and flexural concrete strength are equal to 0.831 and 0.865 for two big samplings of test results of 3650 standard cylinders and beams and 1107 modified cubes and standard beams, respectively. Connections between compressive and flexural concrete strength, which correspond to these values of coefficient of correlation, can be considered statistically significant. It allows the choice of modulus of rupture of concrete (MR) of concrete for thickness design of pavement depending on the specified compressive strength of this concrete.

Using the test result of 3,650 of standard cylinders and beams, the mean value of flexural strength of concrete fr can be estimated depending on the mean value of cylinder compressive strength fc as equal to $9.42\sqrt{fc}$. This estimation of the mean value of flexural strength of concrete corresponds to the theoretical line of linear regression between compressive and flexural strength of concrete. It can be considered as legitimate at least in the range of the change of compressive strength from 2,500 to the 4,750 psi; as can be seen from the FIG. 8, theoretical and empirical lines of regression in this range of change of compressive strength coincide completely. Since the deviation of empirical line of regression from theoretical one is small up to compressive strength of concrete equal to 6,000 psi, estimation of the mean value of flexural strength equal to $9.42\sqrt{fc}$ can be considered as legitimate in the range of change compressive strength from 2,500 to 6,000 psi.

Since the main estimation of compressive strength of concrete in American building practice is cylinder strength, the modified cube strength was assessed as cylinder by dividing by 1.2; the cubic strength of concrete is higher than that of cylindrical strength by 20% on average. Using the test results of 1107 of modified cubes and standard beams, the mean value of flexural strength of concrete fr can be estimated depending on the mean value of modified cubes compressive strength of this concrete fcu.mod is equal to $9.53\sqrt{fcu.mod/1.2}$. Estimations of the mean value of the flexural strength of concrete obtained depending on the mean values of the compressive cylindrical and modified cubes strength of this concrete brought to cylindrical strength are very close and can be considered adequate.

According to said American building code ACI 318, the mean value of compressive strength of concrete fc considered as the required average strength fcr in terms of the ACI 318 must exceed the specified compressive strength fc' by at least 1.34s(fc), where s(fc) is the standard deviation of this strength. The values of the coefficient of variation for compressive and flexural strength of concrete are assumed usually as equal to 15% (Thickness Design for Concrete Highway and Street Pavements, Portland Cement Association, EB109P, p. 34). Based on value of coefficient of variation equal to 15%, this excess can be estimated as 25% of the value of specified compressive strength fc'. Thus, the mean value of compressive strength of concrete fc can be considered as corresponding to certain value of specified compressive strength fc'. Due to the close statistical connections between the compressive and flexural strength of concrete, the mean value of flexural strength of this concrete fr estimated as $9.42\sqrt{fc}$ can also be considered as corresponding to this value of specified compressive strength.

The value of flexural strength multiplied by 50 psi, which is less than the estimation of the mean value of this strength but is nearest to it, should be chosen as the modulus of rupture (MR) of this concrete. Values of specified compressive strength fc' equal to 3,000, 3,500, 4,000, 4,500 and 5,000 psi correspond to the values of modulus of rupture (MR) equal to 550, 600, 650, 700, and 750 psi, respectively, coefficient of variation of compressive strength of concrete being assumed as 15%. These estimations of modulus of rupture of concrete are stable as to the change of coefficient of variation of compressive strength of concrete.

The large sampling of test results of 3650 standard cylinders and beams includes the 81 series of concrete samples of the same mix design. The coefficients of variation of compressive and flexural strength were estimated for all these series. The mean value of coefficient of variation of compressive strength of 81 series of test results of standard cylinder constitutes 10.95%. According to the requirements of ACI 318, required average strength should exceed specified compressive strength at least by 17%. Values of specified compressive strength fc' equal to 3,000, 3,500, 4,000, 4,500 and 5,000 psi corresponds to the values of the required average compressive strength equal to 3,510, 4,095, 4,680, 5,625, and 5,850 psi, respectively. The mean values of flexural strength corresponding to these values of the required average compressive strength estimated by the plot of change flexural strength of concrete depending on the change of the compressive strength (FIG. 8) are very close to 550, 600, 650, 700, and 750 psi, respectively.

As can be seen on the FIG. 8, empirical and theoretical lines of regression do not coincide in the range of change of compressive strength of concrete from 1,000 to 2,000 psi. The values of flexural strength of concrete in this range of the change of compressive strength are estimated as corresponding to the empirical line of regression. The values of compressive strength equal to 1,000, 1,500, and 2,000 psi correspond to the values of flexural strength equal to 250, 350, and 450 psi, respectively. The volume of test results in this range of the change of compressive strength is not good enough for estimation of values of modulus of rupture depending on the specified compressive strength of concrete. Because of this, the values of flexural strength equal to 300, 400, and 450 psi can be considered only approximate as the estimations of modulus of rupture corresponding to the values of specified compressive strength equal to 1,000, 1,500, and 2,000 psi, respectively.

The foregoing estimations of the values of the modulus of rupture of concrete depending on the values of specified compressive strength fc' of this concrete are based on the test results of concrete with all types of coarse aggregate of regular sizes. A considerable part of these aggregates relates to the hard rock (gravel, crushed gravel, and crushed granite). It is well known that flexural strength of concrete with this coarse aggregate is in the range from 10 to 12 percents of compressive strength of concrete, and it increases up to 15 percent of compressive strength for concrete with crushed limestone of regular sizes as a coarse aggregate.

It can be expected the higher flexural strength of concrete with small grains crushed limestone as a coarse aggregate than that for concrete of the same consumption of cement with crushed limestone of regular sizes as a coarse aggregate. It is possible due to more complete penetration of mortar into small grains crushed limestone and more uniform structure of concrete with this coarse aggregate than that for concrete of crushed limestone of regular sizes as a coarse aggregate. The first flexural tests of concrete with crushed limestone as a coarse aggregate of grading intermediate between that for coarse and fine aggregate in the Terminology ASTM C125 confirm this tendency. In these tests the values of flexural strength of concrete equal to 418, 657 and 771 psi correspond to the values of compressive strength equal to 1,476, 2,821, and 4,166 psi, respectively. Flexural strength of concrete in these tests is in the range from 28.35 to 18.5 percent of compressive strength, diminishing with the increase of compressive strength. It does not mean the possibility of such estimations of modulus of rupture of concrete depending on the compressive strength of this concrete. There are only test results of the 3 series of two standard cubes brought to cylinder strength and two standard beams. However it means the tendency which should be checked during the mass production of concrete with crushed limestone of this grading for road construction.

An estimation of coefficient of variation of normal concrete strength equal to 15% is usually assumed and is incorporated into the design charts and tables of ACI and Portland Cement Association documents both for compressive and flexural strength. Concrete with enriched limestone quarry waste as a coarse aggregate is more homogenous than concrete with crushed granite and crushed limestone of regular sizes as a coarse aggregate. The degree of uniformity of this concrete can be considered as intermediate between that for normal concrete with coarse aggregate of regular sizes and mortar. It means that the coefficient of variation of strength of concrete with the enriched limestone quarry waste as coarse aggregate should be less than for concrete with coarse aggregate of regular sizes. Reduction of coefficient of variation of compressive strength of concrete means the possibility to reduce compressive average strength required according to said American building code ACI 318 with corresponding reduction of consumption of cement for this concrete.

The main peculiarity of concrete with limestone quarry waste as a coarse aggregate is the possibility of utilization of great deposits of crushed limestone finer than 9.5 mm, and especially the part of this aggregate finer than 4.75 mm. The minimum of aggregate finer than 4.75 mm before enrichment constitutes near ⅓ of the total weight of aggregate, and it corresponds to very vulnerable aggregate. The use of less vulnerable aggregate means the possibility of reduction of the amount of aggregate coarser than 4.75 mm and corresponding increase of the amount of aggregate finer than 4.75 mm before enrichment. Utilization of great deposits of limestone waste enables to reduce quarrying of high-quality aggregate with corresponding conservation of environment.

Concrete with crushed limestone of grading intermediate between the coarse and fine aggregates in the Terminology ASTM C125 was checked in industrial conditions. Crushed limestone of this grading was used as a coarse aggregate for concrete of precast reinforced concrete temporary road slabs 1.75×3.0×0.16 m dimensions. More than 500 these slabs were produced on September-October 2002 at this plant. These slabs are used for access roads to buildings under construction. They are placed usually into mud without any subbase and work separately. Conditions of service of these slabs under extensive truck traffic are more than adverse. However there were no financial claims to plant connected with the strength of those slabs.

Operation of Preferred Embodiment

The main aim of operation is to obtain concrete with enriched limestone waste as a coarse aggregate of grading optimal in terms of compressive and flexural strength of concrete. It means that in the aggregate bin of concrete plant the amount of aggregate finer than 4.75 mm should be close to but not exceed ⅔ of the total weight of aggregate, the amount of aggregate finer than 4.75 mm but coarser than 2.36 mm should be about 55-60% of the total weight of aggregate, the amount of aggregate finer than 0.3 mm should not exceed about 3% of the total weight of aggregate. Cost of aggregate finer than 9.5 mm and coarser than 4.75 mm depends on the proportion between amounts of aggregate finer and coarser than 4.75 mm before enrichment; cost of aggregate finer than 4.75 mm is considerably less than that for aggregate coarser than 4.75 mm.

Amount of aggregate finer than 4.75 mm before enrichment should be about 50% of the total weight of aggregate. It is determined depending on the breakdown of this aggregate due to handling and transportation to the aggregate bin of concrete plant. Since more coarse parts of aggregate are more vulnerable due to scale effect, breakdown relates mainly to aggregate coarser than 4.75 mm. Breakdown of aggregate depends on the its water-absorption, weather conditions, conditions of handling and transportation, and should be estimated experimentally. Breakdown of aggregate of ten-percent water-absorption under adverse weather conditions, adverse conditions of handling and transportation to aggregate bin of concrete plant results in the doubling of amount of aggregate finer than 4.75 mm. Breakdown of aggregate of less water-absorption should be less, and proportions between amounts of aggregate of finer and coarser than 4.75 mm before enrichment and in aggregate bin of concrete plant should be closer. Moreover, breakdown of aggregate coarser than 4.75 mm caused by screening as a dry enrichment of aggregate should be taking into account also.

Excessive breakdown of enriched limestone waste as a coarse aggregate causes reduction of concrete strength, which should be compensated by additional consumption of cement. Grading of crushed limestone finer than that corresponding to the Size number 9 is consider as unacceptable for its utilization as a coarse aggregate since it requires the increase of consumption of cement non-proportional to the degradation of aggregate.

Stockpiled limestone fines are the washed and clean materials. According to the invention amount of material finer than 0.3 mm should not exceed about 3% of the total weight of aggregate. Such requirements allow carrying out of the enrichment of this material by the inexpensive sizing without the more expensive washing.

Mix design of concrete with crushed limestone of this grading can be carried out with the same consumption of cement and twice less consumption of admixture required for concrete of the same specified compressive strength with crushed granite of regular Sizes No. 57 or No. 67 as a coarse aggregate; concrete with crushed granite of said regular sizes is considered as the standard in the world construction practice. Reduction of dimensions of coarse aggregate requires a corresponding increase of consumption of cement. As applied to concrete of specified compressive strength in the range from 2,000 psi to 5,000 psi the share of cement per $m^3$ of mix of said concrete being in the ranges of 175 to 600 kg; the share of water per $m^3$ of said concrete mix being in the ranges of 140 to 225 kg; the share of sand as a fine aggregate per $m^3$ of said concrete mix being in the range of 500 to 950 kg; the share of said coarse aggregate per $m^3$ of said concrete mix being in the range of 1,080 to 1,150 kg . Enriched limestone waste is a moist material, and batch plant corrections must be made for moisture in this coarse aggregate.

CONCLUSION

Concrete with small grains crushed limestone finer than 9.5 mm as a coarse aggregate is characterized by the specified compressive strength fc' and modulus of rupture (MR) up to 5,000 psi and more than 750 psi, respectively. The coarse aggregate of this concrete defined as enriched limestone waste is a processed by-product of the manufacture of crushed limestone of regular sizes. Since this by-product is washed and clean material and the amount of grains finer than 0.3 mm is limited to about 3% of the total weight of aggregate, its enrichment can be carried out by the inexpensive sizing without the more expensive washing.

According to the definition of ASTM C 125 (Standard Terminology Relating to Concrete and Concrete Aggregates) "coarse aggregate, n-(1) aggregate predominantly retained on the 4.75-mm (No. 4) sieve; or (2) that portion of an aggregate remained on the 4.75-mm (No. 4) sieve". As applied to the enriched limestone waste as a coarse aggregate of claimed concrete in aggregate bin of concrete plant the amount of aggregate finer than 4.75 mm (Sieve No. 4) should be about ⅔ of the total weight of aggregate. The main part of this aggregate should be coarser than 2.36 mm; the amount of aggregate finer than 2.36 mm (Sieve No. 8) should not exceed about 10% of the total weight of aggregate. The amount of aggregate finer than 1.18 mm (Sieve No. 16) should not exceed about 7% of the total weight of aggregate. The amount of aggregate finer than 300 µm (Sieve No. 50) should not exceed about 3% of the total weight of aggregate. Grading of enriched limestone waste in aggregate bin of concrete plant should be finer than the least Size of coarse aggregate number 89 and coarser than for largest Size of fine aggregate number 9 according to ASTM C 33. This grading can be considered as intermediate between the coarse and fine aggregates in Terminology of ASTM C125. Moreover, this grading can be considered as optimal in terms of compressive and especially flexural strength of concrete, and in terms of utilization of great deposits of limestone finer than 4.75 mm.

Limestone quarry waste as a raw material for enrichment should be finer than 9.5 mm. The amount of aggregate finer than 4.75 mm (Sieve No. 4) before enrichment should be about 50%. After enrichment the main part of aggregate finer than 4.75 mm should be coarser than 2.36 mm. The amount of aggregate finer than 2.36 mm (Sieve No. 8) after enrichment should not exceed about 10%; the amount of aggregate finer than 1.18 mm (Sieve No. 16) should not exceed about 7%; the amount of aggregate finer than 300 µm (Sieve No. 50) should not exceed about 2%.

Grading of this aggregate at the quarry after enrichment and in the aggregate bin of concrete plant differs due to inevitable breakdown of aggregate caused by handling and transportation from quarry to concrete plant. Due to scale effect large grains are more vulnerable, and breakdown of aggregate relates mainly to its part coarser than 4.75 mm. As a result, the amount of aggregate finer than 4.75 mm after transportation to aggregate bin of concrete plant should be increased. The breakdown of aggregate should be estimated experimentally and taking into consideration when determining of proportion between parts of aggregate finer and coarser than 4.75 mm before enrichment of this aggregate.

The grading of coarse aggregate intermediate between the coarse and fine aggregates in Terminology of ASTM C125 can be considered as optimal in terms of concrete strength. Compressive strength of concrete with crushed limestone of this grading as a coarse aggregate is higher at least by 10% than that of concrete of the same consumption of cement with crushed limestone of grading corresponding to that of the Sizes 89 and 9. Moreover, compressive strength of concrete with crushed limestone of this grading as a coarse aggregate is substantially as high or higher than that of concrete of the same consumption of cement and twice as high consumption of admixture with crushed granite of regular sizes No. 57 and No. 67 of nominal dimensions 25.0 to 4.75 mm and 19 to 4.75 mm, respectively, as a coarse aggregate, while the flexural strength of this concrete is higher than that for concrete of the same consumption of cement with crushed granite of said Sizes No. 57 and No. 67 as a coarse aggregate, concrete with crushed granite of said regular sizes being considered as the standard in the world construction practice.

Close statistical connections between compressive and flexural strength of concrete allows estimation of modulus of rupture of concrete depending on the specified compressive strength of this concrete. It means the possibility to carry out mix design of road concrete based on the average compressive strength required according to ACI 318 and replacement of mix design according to the modulus of rupture of concrete by a more convention design according to the value of the specified compressive strength of concrete corresponding to the value of modulus of rupture of this concrete.

Enriched limestone waste is one of the cheapest aggregates. However, the use of this aggregate allows obtaining concrete of specified compressive strength fc' and modulus of rupture (MR) up to 5,000 and more than 750 psi, respectively. The area of application of concrete with this coarse aggregate and that of concrete with crushed limestone of regular sizes is the same. Application of this concrete to the road construction means a reduction of its cost, an increase in competitiveness of concrete pavements as compared with that of asphalt pavements, and replacement of bitumen by cement produced with coal as a fuel.

The invention claimed is:

1. A concrete wherein the coarse aggregate is of small grains crushed limestone finer than 9.5 mm of grading intermediate between the least Size of coarse aggregate No. 89 and largest Size No. 9 of fine aggregate according to ASTM C33 and wherein the amount of said coarse aggregate finer than 4.75 mm is about two-third of the total weight of said coarse aggregate.

2. A concrete as claimed in claim 1 wherein the amount of said coarse aggregate finer than 2.36 mm corresponding to Sieve No. 8 according to ASTM C33 does not exceed about 10% of the total weight of said coarse aggregate.

3. A concrete as claimed in claim 2 wherein the amount of said coarse aggregate finer than 1.18 mm corresponding to Sieve No. 16 according to ASTM C33 does not exceed about 7% of the total weight of said coarse aggregate.

4. A concrete as claimed in claim 3 wherein the amount of said coarse aggregate finer than 300 μm corresponding to the Sieve No. 50 according to ASTM C33 does not exceed about 3.0% of the total weight of aggregate.

5. A concrete as claimed in claim 3 wherein the share of cement per m³ of mix of said concrete being in the ranges of 175 to 500 kg; the share of water per m³ of said concrete mix being in the ranges of 140 to 225 kg; the share of sand as a fine aggregate per m³ of said concrete mix being in the range of 500 to 950 kg; the share of said coarse aggregate per m³ of said concrete mix being in the range of 1,080 to 1,150 kg.

6. A concrete of specified compressive strength $f_c'$ and modulus of rupture up to 5,000 psi and more than 750 psi, respectively, with small grains crushed limestone finer than 9.5 mm of grading intermediate between the least Size of coarse aggregate No. 89 and largest Size No. 9 of fine aggregate according to ASTM C33 as a coarse aggregate wherein:

the physical properties of said coarse aggregate are in accordance with requirements of ASTM C33 the amount of said coarse aggregate finer than 4.75 mm is about two-third of the total weight of aggregate and less than that of the largest Size of fine aggregate number 9 according to ASTM C33 the amount of said coarse aggregate finer than 2.36 mm corresponding to the Sieve No. 8 according to ASTM C33 does not exceed about 10% of the total weight of aggregate the amount of said coarse aggregate finer than 1.18 mm corresponding to the Sieve No. 16 according to ASTM C33 does not exceed about 7% of the total weight of aggregate the amount of said coarse aggregate finer than 300 μm corresponding to the Sieve No. 50 according to ASTM C33 does not exceed about 3.0% of the total weight of aggregate the share of cement per m³ of mix of said concrete being in the range of 175 to 500 kg; the share of water per m³ of said concrete mix being in the range of 140 to 225 kg; the share of sand as a fine aggregate per m³ of said concrete mix being in the range of 500 to 950 kg; the share of said coarse aggregate per m³ of said concrete mix being in the range of 1,080 to 1,150 kg.

7. The concrete of claim 6 wherein said coarse aggregate is defined as enriched limestone waste and is a processed by-product of the manufacture of crushed limestone of regular sizes, the process of sizing of this by-product and the physical properties of this coarse aggregate being in accordance with requirements of ASTM C33.

8. The concrete of claim 6 wherein the compressive strength is higher at least by 10% than that of concrete of the same consumption of cement with crushed limestone as a coarse aggregate of grading corresponding to that of the Size No. 89 and Size No. 9.

9. The concrete of claim 6 wherein the compressive strength of said concrete is substantially as high or higher than that of concrete of the same consumption of cement and twice as high consumption of admixture with crushed granite of regular sizes No. 57 and No. 67 of nominal dimensions 25.0 to 4.75 mm and 19 to 4.75 mm, respectively, as a coarse aggregate, while the flexural strength of this concrete is higher than that for concrete of the same consumption of cement with crushed granite of said Sizes No. 57 and No. 67 as a coarse aggregate, concrete with crushed granite of said regular sizes being considered as the standard in the world construction practice.

10. The concrete of claim 6 wherein the mix design of said concrete is determined by the value of modulus of rupture equal to the mean value of 28-day flexural strength of said concrete according to Portland Cement Association Engineering Bulletin EB 109P, said mean value of 28-day flexural strength of concrete being estimated as $9.42\sqrt{f_{cr}'}$ where $f_{cr}'$ is the mean value of 28-day compressive strength defined according to American building code ACI 318 as required average 28-day compressive strength of said concrete.

11. The concrete of claim 10 wherein the required average 28-day compressive strength of said concrete is determined depending on the value of specified compressive strength $f_c'$ of said concrete according to American building code ACI 318, said modulus of rupture of said concrete equal to the mean value of flexural strength depending on also the value of specified compressive strength $f_c'$ of said concrete.

12. The concrete of claim 10 wherein the mix design of said concrete determined by said value of modulus of rupture equal to the mean value of flexural strength of this concrete can be replaced by the more convenient mix design of said concrete of specified compressive strength fc' corresponding to said value of modulus of rupture.

13. The concrete of claim 10 wherein the mix design of the concrete of said subbase of values of modulus of rupture (MR) equal to 450, 500, 550, 600, 650, 700, and 750 psi can be carried out according to the values corresponding to the 28-day values of specified compressive strength fc' equal to 2,000, 2,500, 3,000, 3,500, 4,000, 4,500 and 5,000 psi, respectively.

* * * * *